United States Patent [19]

Jungersen

[11] Patent Number: 4,987,978

[45] Date of Patent: Jan. 29, 1991

[54] WHEELCHAIR SAFETY BRAKES

[76] Inventor: Thoger G. Jungersen, Rte. 2, Box 94-R, Concord, Va. 24538

[21] Appl. No.: 419,516

[22] Filed: Oct. 10, 1989

[51] Int. Cl.$^5$ .............................................. B60T 1/04
[52] U.S. Cl. .................................. 188/2 F; 280/304.1
[58] Field of Search .......................... 188/2 F, 29, 74; 280/304.1

[56] References Cited

U.S. PATENT DOCUMENTS 4,589,525 5/1986 Phipps et al. ...................... 188/2 F
4,887,830 12/1989 Fought et al. .................... 188/2 F X

FOREIGN PATENT DOCUMENTS 1243032 8/1971 United Kingdom ................. 188/2 F
2110780 6/1983 United Kingdom ................. 188/2 F Primary Examiner—Duane A. Reger

[57] ABSTRACT

A safety brake for use on an invalid wheelchair, specifically for the purpose of making travel up an incline, such as a ramp, easier and safer. When ascending an incline, the user often has difficulty getting a new grip quickly enough to avoid rolling back downhill. The present invention can, at the user's option, be set to permit travel forward only, or backward only. Thus, it permits the user to safely move up an incline either forward or backward without risk of rolling down when changing the grip of the hands. It consists of a somewhat egg shaped (when viewed from the end) cam on a housing, which has longitudinal serrations on both sides to grip the tire, and which housing is rotatably mounted on a core. The core having two cam segments engageable by a spring loaded cam follower which serves to urge the serrations of the housing against the tire of the wheelchair to permit travel in only one direction, depending upon which of the two cam segments the follower is set to engage, at the user's option. The serrations on the housing cam's one side will slide over the tire in one direction while gripping it if it tries to turn in the other direction. This invention will be activated when the brake lever is set in locked position. When the brake lever is released the wheels can rotate in either direction in the normal way.

3 Claims, 1 Drawing Sheet

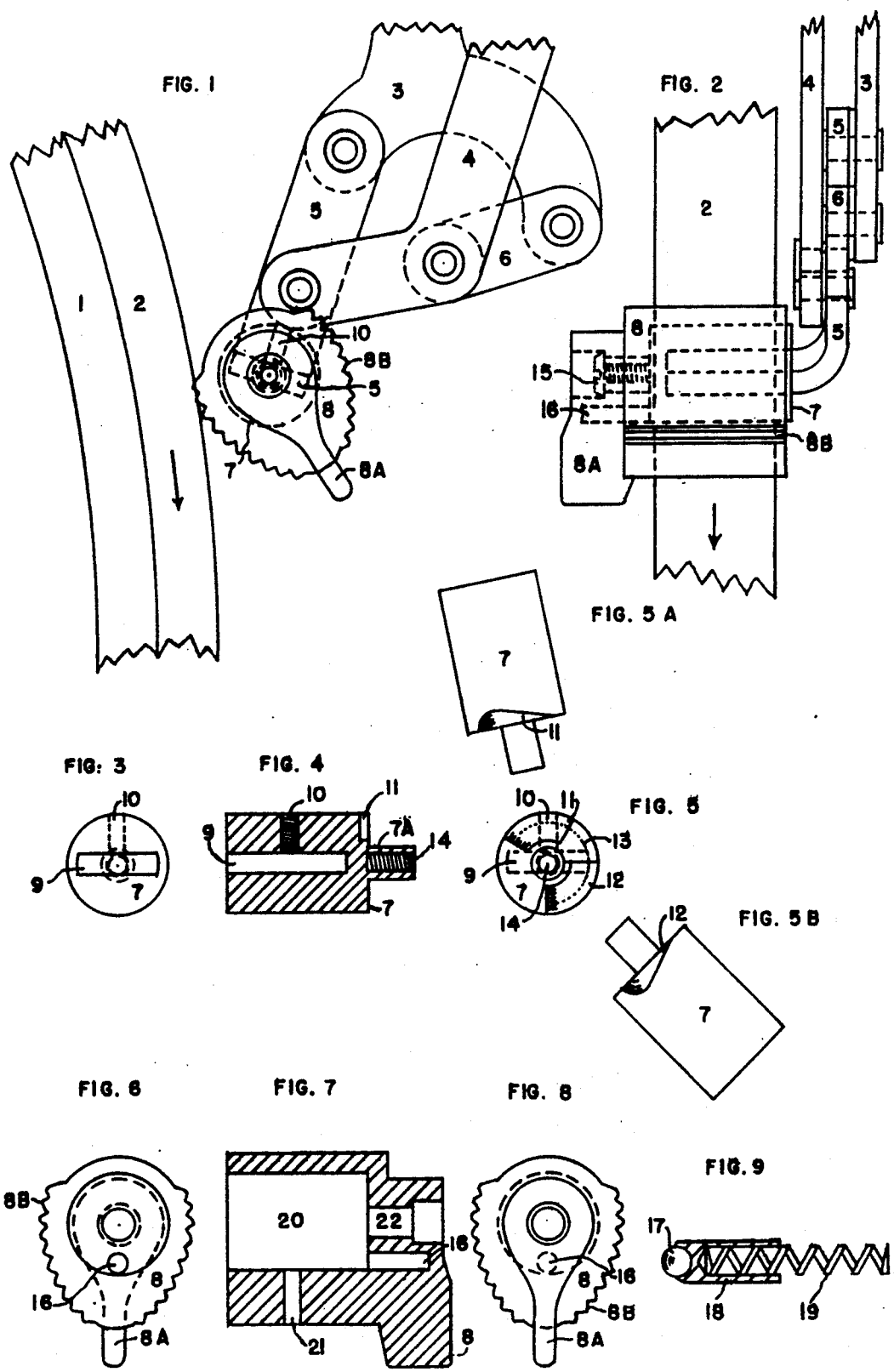

WHEELCHAIR SAFETY BRAKES

PRIOR ART CONSIDERATIONS

The commonly used wheelchair brake is simply a bar which makes locking contact with the wheelchair tire when the brake lever is moved to the braking position. It is simply intended to prevent the wheelchair from moving, being in fact more of a wheel lock than a brake.

When ascending an incline the user must try to keep the wheelchair from rolling back by quickly moving the hands for a new grip to advance it further up the incline. This may be relatively easy for a younger person with strong arms and upper body, but it can present quite a problem for weaker users, or those of advanced age, or with muscular problems to whom quick movement can be difficult, painful and even practically impossible.

The device shown in U.S. Pat. No. 4,560,033 is intended for a somewhat similar purpose, however, it is only useable for forward movement of the wheelchair. It also requires complete replacement of the brake assembly, making it rather costly. Granted most travel up an incline will be in a forward direction, however, in many cases it is necessary to back up a ramp, such as when entering a van or other vehicle. The present invention permits the user to travel up the incline either forward or backward with the same degree of safety.

The device shown in U.S. Pat. No. 3,869,146 does permit travel in both directions, but is rather cumbersome, adds considerable weight, requires change in the wheelchair and requires the user to change the method of propelling the chair. It also adds to the width of the wheelchair, which may hamper movement through narrow doors.

Obviously the move complicated any device is and the larger it is, the more costly it becomes. In the case of attachments to older wheelchairs already in use, it is important that this can be done simply with as little change as possible, in order to keep installation costs at a minimum.

The need for a simplified safety brake has existed for as long as there have been wheelchairs, and although all of the elements for it have been at hand for as long as the need has existed, no one has heretofore combined them to make this new and useful invention.

SUMMARY OF THE INVENTION

It is an object of this invention to provide a simple safety brake for wheelchairs, specifically intended to make uphill travel on inclines, such as ramps, easier and safer, which can be readily adapted for installation on new wheelchairs as original equipment.

Another object of this invention is to provide a simple safety brake for wheelchairs, specifically intended to make uphill travel on inclines, such as ramps easier and safer, and which can be used as an adapter for easy mounting on most currently used wheelchairs with out major alterations.

Another object of this invention is to provide a simple safety brake for wheelchairs, specifically intended to make uphill travel on inclines, such as ramps, easier and safer, which is simple to manufacture and simple to install so that the cost to the user is kept as low as possible.

BRIEF DESCRIPTION OF THE DRAWINGS

These and other objects and advantages of this invention will appear more clearly from the following specification in conjunction with the accompanying drawings, in which:

FIG. 1 is a partial view of the right side of a normal wheelchair's wheel and brake assembly, with the present invention in place on the brake bar, showing the first of the serrations making contact with the tire.

FIG. 2 is a partial view of the same parts as seen from the front, illustrating how the brake bar is normally bent and how the present invention merely slides over it to be mounted.

FIG. 3 is a view of the open end of the core.

FIG. 4 is a sectional view of the core.

FIG. 5 is a view of the cam end of the core showing the relationship between the two cam segments and the slot for the brake bar.

FIG. 5A is a view of one side of the core showing the cam segment for backward movement of the wheelchair.

FIG. 5B is a view of the other side of the core showing the cam segment for forward movement of the wheelchair.

FIG. 6 is a view of the open end of the housing showing the serrations on both sides thereof.

FIG. 7 is a sectional view of the housing showing the relationship of the core and the cam follower.

FIG. 8 is a view of the outer end of the housing showing the other end of the serrations of FIG. 6 and the control lever portions of the housing.

FIG. 9 is a double sized sectional view of the cam-follower with its ball bearing in one end and the spring in the other end.

NOTE: All of the figures are drawn for a unit to be mounted on the right side of the wheelchair. A unit for the left side would be a mirror image of them.

DETAILED DESCRIPTION OF THE INVENTION

Referring now to FIG. 1 and FIG. 2, it will be seen that numbers 1 and 2 represent the rim of the wheelchair wheel and tire respectively. Numbers 3, 4, 5 and 6 represent the more or less standard brake assembly, in which the brake bar 5, can be moved toward or away from the tire 2, by moving the brake lever 4. The mounting bracket 3, attaches to the wheelchair frame above (not shown). 6 is merely a connecting link. The four rivets and spacing washers used in joining the assembly are shown but not numbered.

The present invention is shown mounted on the brake bar 5. In it the core 7 slides directly over the brake bar 5 and is held in place by a setscrew (not shown) in the hole 10. The oval-shaped housing 8 is rotatably mounted on the core 7, and has its outer end shaped to form a control lever 8A, and its side provided with serrations 8B to grip the tire 2. It also has a blind hole 16 which houses a cam follower 18, and a spring 19, (see FIG. 9). The housing 8 is held rotatably in place on the core 7 by the screw 15.

FIGS. 3, 4, 5, 5A and 5B are all different views of the core 7 to illustrate the details thereof. In these, the slot 9, slides over the lower end of the brake bar 5 (FIGS. 1 and 2), to be held in place by the setscrew (not shown) in the hole 10. The core 7 fits loosely into the hole 20 (FIG. 7) and has a neck 7A, which fits through the hole 22 (FIG. 7) and has a threaded hole 14 to receive the screw 15 (FIG. 2) the neck 7A is slightly longer than the depth of the hole 22, so that when the screw 15 is tightened it will not lock the housing 8 in place on the core 7, but will permit it to rotate freely. The core 7, has two cam segments in its one end, the one 11 being backward movement of the wheelchair, while the other 12 is for forward movement of the wheelchair. When the control lever portion 8A of the housing 8 is in the position shown in FIG. 1 and FIG. 2, the wheel can rotate only in the direction indicated by the arrows on the tire 2, permitting forward movement only. The cam segment 12, with the spring loaded cam follower 18, will urge the serrated outer cam 8B of the housing against the tire 2, permitting the wheel to turn in the direction indicated on the tire 2, but if the tire starts to reverse direction, the serrated cam portion 8B of the housing 8 will grip the tire 2, preventing backward movement of the wheelchair. If the control lever portion 8A is turned upwards, the other set of serrations 8B will engage the tire 2, permitting backward movement of the wheelchair only. The track of the cam follower 18 is indicated by the dotted line 13 in FIG. 5.

FIGS. 6, 7 and 8 are all views of the housing 8. The serrations 8B run all the way from one end to the other end of the cam shaped portion of the housing 8. They are indicated in FIG. 2 only in the lower portion, as continuing the lines upward would make it all but impossible to see how the device mounts on the lower end of the brake arm 5. While the hole 16 for the cam follower 18 is shown as a blind hole, it is obvious that it could also be a through hole with a setscrew in the outer end to keep the spring 19 in place.

FIG. 9 is a double sized (for clarity) sectional view of the cam follower 18, with a ball bearing 17 in one end and a spring 19 in the other.

The hole 21, shown in FIG. 7, is merely an access hole for engaging the setscrew in the hole 10 when the control lever portion 8A is in an upward position. It is used only when mounting the unit on the brake bar 5 when installing it.

What is claimed is:

1. A safety brake mechanism for a wheelchair to prevent rollback when the user changes position of the hands while ascending an incline, such as a ramp, permitting the user to selectively travel forward only or backward only, comprising a frame attached to the wheelchair, a brake handle pivoted to the frame, a core member attached to the lever adjacent the tire of the wheelchair, an oval shaped housing having a serrated cam surface on opposite sides thereof, the housing being rotatably mounted on the core member, the core member having two activating cam segments, one for forward movement only, one for backward movement only, for cooperating with the housing for positioning thereof, a spring activated mechanism engaging either cam segment for locating the housing as described by the wheelchair user, actuation of the housing by the user causing one or the other of the serrated cam surfaces to contact the tire of the wheelchair in a manner permitting the serrated cam to slide over the surface of the tire in one direcion while engaging the tire to stop movement in the other direction.

2. A brake as in claim 1 in which the activating cam segments are located in the end of the core.

3. A brake as in claim 1 is which a control lever actuated by the user in an integral part of the housing.

* * * * *